US011236949B2

(12) United States Patent
Yan et al.

(10) Patent No.: US 11,236,949 B2
(45) Date of Patent: Feb. 1, 2022

(54) HEAT TRANSFER SHEET ASSEMBLY WITH AN INTERMEDIATE SPACING FEATURE

(71) Applicant: Arvos Ljungstrom LLC, Wellsville, NY (US)

(72) Inventors: Huo Yan, Hefei (CN); Jeffrey M. O'Boyle, Wellsville, NY (US); Glenn D. Mattison, Machias, NY (US); Jeffery E. Yowell, Portville, NY (US)

(73) Assignee: Arvos Ljungstrom LLC, Wellsville, NY (US)

( * ) Notice: Subject to any disclaimer, the term of this patent is extended or adjusted under 35 U.S.C. 154(b) by 113 days.

(21) Appl. No.: 16/473,444

(22) PCT Filed: Apr. 10, 2017

(86) PCT No.: PCT/US2017/026840
§ 371 (c)(1),
(2) Date: Jun. 25, 2019

(87) PCT Pub. No.: WO2018/125270
PCT Pub. Date: Jul. 5, 2018

(65) Prior Publication Data
US 2020/0149824 A1 May 14, 2020

Related U.S. Application Data

(63) Continuation of application No. PCT/US2016/069186, filed on Dec. 29, 2016.

(51) Int. Cl.
*F28D 11/02* (2006.01)
*F28D 19/00* (2006.01)
*F28D 19/04* (2006.01)

(52) U.S. Cl.
CPC ........ *F28D 19/044* (2013.01); *F24F 2203/10* (2013.01); *F28D 11/02* (2013.01)

(58) Field of Classification Search
CPC ............ F24F 2203/10; F24F 2203/104; F24F 2203/108; F28D 11/02; F28D 19/00; F28D 19/04; F28D 19/041; F28D 19/042
(Continued)

(56) References Cited

U.S. PATENT DOCUMENTS 2,596,642 A 5/1952 Boestad
4,396,058 A 8/1983 Kuschner et al.
(Continued)

FOREIGN PATENT DOCUMENTS

EP 2700893 A1 2/2014
WO 9822768 A1 5/1998
(Continued)

OTHER PUBLICATIONS

Notification of International Search and Written Opinion issued in corresponding PCT Application No. PCT/US2017/026840, dated Nov. 16, 2017, pp. 1-11.

*Primary Examiner* — Frantz F Jules
*Assistant Examiner* — Jason N Thompson
(74) *Attorney, Agent, or Firm* — Murtha Cullina LLP

(57) ABSTRACT

A heat transfer sheet assembly for a rotary regenerative heat exchanger has first and second heat transfer sheet elements stacked one against the other with a first repeat of a first profile on one sheet element opposing a second repeat of a second profile on the other sheet element. The sheet elements are spaced apart by a plurality of wide-gauged parallel sheet spacing features of the first profile repeat RI of the second profile repeat to form a generally close sided elongate channel for gaseous flow therethrough. The second profile of repeat includes an elongate fifth sheet spacing feature in the form of a lobe contacting undulations of the adjacent first profile of repeat.

15 Claims, 8 Drawing Sheets

(58) Field of Classification Search
 USPC ............................................................ 165/8
 See application file for complete search history.

(56) References Cited

U.S. PATENT DOCUMENTS

| | | | |
|---|---|---|---|
| 4,744,410 A | 5/1988 | Groves | |
| 5,318,102 A * | 6/1994 | Spokoyny | F28D 19/042 |
| | | | 165/10 |
| 5,836,379 A * | 11/1998 | Counterman | F28D 19/044 |
| | | | 165/10 |
| 5,899,261 A * | 5/1999 | Brzytwa | F28D 19/044 |
| | | | 165/8 |
| 5,979,050 A * | 11/1999 | Counterman | B21D 13/04 |
| | | | 165/10 |
| 6,019,160 A * | 2/2000 | Chen | F28D 19/044 |
| | | | 165/10 |
| 6,179,276 B1 * | 1/2001 | Chen | F28D 19/044 |
| | | | 261/112.2 |
| 9,200,853 B2 * | 12/2015 | O'Boyle | F28D 19/042 |
| 2003/0178173 A1 * | 9/2003 | Harting | F28D 19/044 |
| | | | 165/8 |
| 2011/0042035 A1 * | 2/2011 | Seebald | F28D 19/044 |
| | | | 165/8 |
| 2012/0305217 A1 * | 12/2012 | Cowburn | F28D 19/044 |
| | | | 165/67 |

FOREIGN PATENT DOCUMENTS

| | | |
|---|---|---|
| WO | 0113055 A1 | 2/2001 |
| WO | 2010129092 A1 | 11/2010 |

\* cited by examiner

HEAT TRANSFER SHEET ASSEMBLY WITH AN INTERMEDIATE SPACING FEATURE

CROSS REFERENCE TO RELATED APPLICATIONS

The instant application is a U.S. National Stage of and claims priority to PCT/US2017/026840 for "A Heat Transfer Sheet Assembly with an Intermediate Spacing Feature" filed on Apr. 10, 2017, which is a continuation application of and claims priority to PCT/US2016/069186, filed on Dec. 29, 2016, the subject matter of both aforementioned applications are hereby incorporated by reference in their entireties.

FIELD OF THE INVENTION

This invention relates to a heat transfer sheets assembly for rotary regenerative air preheaters for transfer of heat from a flue gas stream to a combustion air stream and more particularly relates to heat transfer sheets assemblies having two disparate profile repeats which cooperate to facilitate the use of higher soot blowing pressures than the norm whilst maintaining structural rigidity and heat transfer characteristics.

BACKGROUND OF THE INVENTION

Rotary regenerative air preheaters are typically used to transfer heat from a flue gas stream exiting a furnace, to an incoming combustion air stream to improve the efficiency of the furnace. Conventional preheaters include a heat transfer sheet assembly that includes a plurality of heat transfer sheets stacked upon one another in a basket. The heat transfer sheets absorb heat from the flue gas stream and transfer this heat to the combustion air stream. The preheater further includes a rotor having radial partitions or diaphragms defining compartments which house a respective heat transfer sheet assembly. The preheater includes sector plates that extend across upper and lower faces of the preheater to divide the preheater into one or more gas and air sectors. The hot flue gas stream and combustion air stream are simultaneously directed through respective sectors. The rotor rotates the flue gas and combustion air sectors in and out of the flue gas stream and combustion air stream to heat and then to cool the heat transfer sheets thereby heating the combustion air stream and cooling the flue gas stream.

Conventional heat transfer sheets for such preheaters are typically made by form-pressing or roll-pressing a sheet of a steel material. Typical heat transfer sheets include sheet spacing features formed therein to position adjacent sheets apart from one another and to provide structural integrity of the assembly of the plurality of heat transfer sheets in the basket. One example is PCT Publication WO 01/13055 (Brown), which has a plurality of widely scattered spacing feet. Another earlier example is illustrated in FIG. 3 of U.S. Pat. No. 2,596,642 (Boestad). Unlike in Brown, Boestad has adjacent pairs of sheet spacing features forming channels for the flue gas or combustion air to flow through. The provision of flow channels is now standard in the art. Advantageously, to promote controlled flow these channels may be closed-sided as illustrated in FIG. 2 of U.S. Pat. No. 4,396,058 (Kurschner) and as improved in U.S. Pat. No. 4,744,410 (Groves). Some heat transfer sheets include undulation patterns between the sheet spacing features to impede flow in a portion of the channel and thereby causing turbulent flow which increases heat transfer efficiency. Boestad is an example of this in a heat transfer sheet assembly having what may be termed open-sided channels in which undulations traverse the sheet spacing features permitting transverse gaseous flow between adjacent channels. U.S. Pat. No. 5,836,379 (Counterman) discloses a heat transfer sheet assembly having closed-sided channels with undulations in which the channels are formed by spacing notches of a first element sheet contacting spacing flats of an identical second element sheet (as can be seen in Counterman FIG. 6).

It will be understood that the size, position and configuration of the sheet spacing features in combination with the sheet material thickness, stacking pressure in the basket and thermal cycling experienced in use, contribute to the structural rigidity of the walls of the channels.

Typical sheet spacing features are of a configuration that allows the flue gas or combustion air to flow through open sided sub-channels formed by the sheet spacing features, uninterrupted at high velocities and with little or no turbulence. As a consequence of the uninterrupted high velocity flow, heat transfer from the flue gas or combustion air to the sheet spacing features is minimal. It is generally known that causing turbulent flow through the plurality of heat transfer sheets such as through the channels defined by and between adjacent sheet spacing features increases pressure drop across the preheater. In addition, it has been found that abrupt changes in direction of flow caused by abrupt contour changes in the heat transfer sheets increases pressure drop and creates flow stagnation areas or zones that tend to cause an accumulation of particles (e.g. ash) in the flow stagnation areas. This further increases pressure drop across the preheater. Such increased pressure drop reduces overall efficiency of the preheater due to increased fan power required to force the combustion air through the preheater. The efficiency of the preheater also reduces with increasing weight of the assembly of heat transfer sheets in the baskets due to the increased power required to rotate the flue gas and combustion air sectors in and out of the flue gas and combustion air streams.

Therefore, it will be understood that there is a trade-off between material composition, structural stability and operational efficiency. In long term operation it has proved problematic if too little packing pressure is used particularly if sheets upon thermal expansion of the baskets are able to rattle against one another causing mechanical and/or fatigue damage. An obvious solution is to make the channels smaller, i.e. structurally more rigid but this has a negative impact on both operational efficiency and cleanability. The latter issue is critical particularly in cold-end elements, i.e. those at the cold side of the preheater, because here the accumulation of soot and predisposition to clogging with popcorn ash or other fouling mechanism is greater than at hot-end elements.

There exists a need for improved light weight heat transfer sheets that form a closed channel sheet element assembly that is able to survive higher soot blowing pressures or more soot blowing cycles than hitherto without materially effecting thermal performance and mechanical/structural stability.

SUMMARY

According to an aspect of the present disclosure, a heat transfer sheet assembly for a rotary regenerative heat exchanger includes: a first sheet element having a first profile comprising a plurality of parallel and elongate first and second sheet spacing features extending longitudinally in a gaseous flow direction with a first repeat of said first profile being defined between and including immediately first and second sheet spacing features; and a second sheet element of equivalent length having a second profile comprising a complementary plurality of wide gauged, parallel and elongate third and fourth sheet spacing features with a second repeat of said second profile being defined between and including immediately adjacent third and fourth sheet spacing features. The first sheet is packed against the second sheet with the first and third spacing features of respective matched pairs of the plurality of first and second sheet spacing features and the plurality of third and fourth sheet spacing features seating against one another and the second and fourth features of the respective matched pairs seating against one another to define for each matched pair a generally close sided elongate channel for gaseous flow therethrough. The first element has lobular heat transfer undulations extending laterally and uninterrupted in between each of the first and second spacing features. The second sheet element further includes a respective elongate fifth sheet spacing feature extending longitudinally along at least half a length of the second sheet element, intermediate the third and fourth sheet spacing features of each matched pair. Each fifth sheet spacing feature includes a lobe contacting at least some of the lobular heat transfer undulations between the first and second sheet spacing features of a respective matched pair. The fifth feature lobe has an amplitude less than or equal to a spacing provided by the seated first and third sheet spacing features and the seated second and fourth sheet spacing features.

The first sheet spacing feature could include a lobe extending away from the nominal plane of the first sheet element and the third sheet spacing feature could include a flat in the nominal plane of the second sheet element.

In an embodiment, the second sheet spacing feature includes a lobe extending away from the nominal plane of the first sheet element and the fourth feature includes a flat in the nominal plane of the second sheet element.

The fifth sheet spacing feature could be a notch configuration that includes a notch extending the length of the second sheet element and having the lobe extending away from the nominal plane of the second sheet element toward the said first sheet element and a second lobe extending in the opposite direction away from the first sheet element with the two lobes connected by a flat sheet section.

In another embodiment, the fifth sheet spacing feature is an alternating notch configuration extending the length of the second sheet element and including at least one first elongate section having a lobe or notch extending away from the central plane of the second sheet toward the first sheet element adjacent at least one second elongate section. Opposing ends of the first and second elongate sections are connected to one another.

The second elongate section could include a lobe extending away from the central plane of the second sheet element oppositely to the first elongate section lobe.

The second sheet element could include lobular heat transfer undulations extending laterally and uninterrupted respectively between the third and fifth sheet spacing features and the fifth and fourth sheet spacing features.

In an embodiment, the undulations of the first sheet element run oblique to the undulations of the second sheet element.

In yet another embodiment the first sheet element and the second sheet element comprise sheet stock which has a composite third profile comprising both the first repeat of the first profile and the second repeat of the second profile, with the first repeat and the second repeat alternating laterally across the sheet. One of the first and second sheet spacing features that ends laterally one such first repeat provides one of the third and fourth sheet spacing features and begins laterally an immediately adjacent second repeat. Another one of the third and fourth sheet spacing features that ends laterally the immediately adjacent second repeat provides another of the first and second sheet spacing features and begins laterally a next immediately adjacent first repeat.

Preferably, the first repeat begins laterally with a flat in a nominal plane of the sheet stock comprising the first sheet spacing feature and ends with a lobe extending away from the nominal plane of the sheet stock comprising the second sheet spacing feature and also providing the third sheet spacing feature beginning the immediately adjacent second repeat, which ends with a flat providing the fourth sheet spacing feature of the immediately adjacent second repeat and the first sheet spacing feature of the next immediately adjacent first repeat and with the immediately adjacent second repeat having intermediate its third and fourth sheet spacing features the fifth sheet spacing feature with the lobe of the fifth sheet spacing feature extending away from the nominal plane of the sheet stock.

The sheet stock may have a front face and a back face available for heat transfer, with the front face of the first sheet element opposing and in part contacting the back face of the second sheet element.

The first repeat of the first profile could comprise elongate lobular heat transfer undulations extending laterally obliquely and uninterrupted between the first and second sheet spacing features beginning and ending said first profile, and the second repeat of the second profile could comprise obtuse bisected lobular heat transfer undulations extending laterally obliquely between the second and third sheet spacing features beginning and ending said second profile bisected by the fifth sheet spacing feature. The elongate undulations may extend in a first direction and the bisected undulations extend in a second direction different from the first direction.

Advantageously, the heat transfer sheet assembly has a multiplicity of first sheet elements and second sheet elements stacked in a basket and sandwiched between two support sheets with heat transfer undulations extending outwardly from the sheet elements immediately adjacent a respective support sheet contacting the respective support sheet at support points spaced apart laterally by about 57 to 76 mm (2.25 to 3 inches).

DETAILED DESCRIPTION OF THE INVENTION

Figure 1:
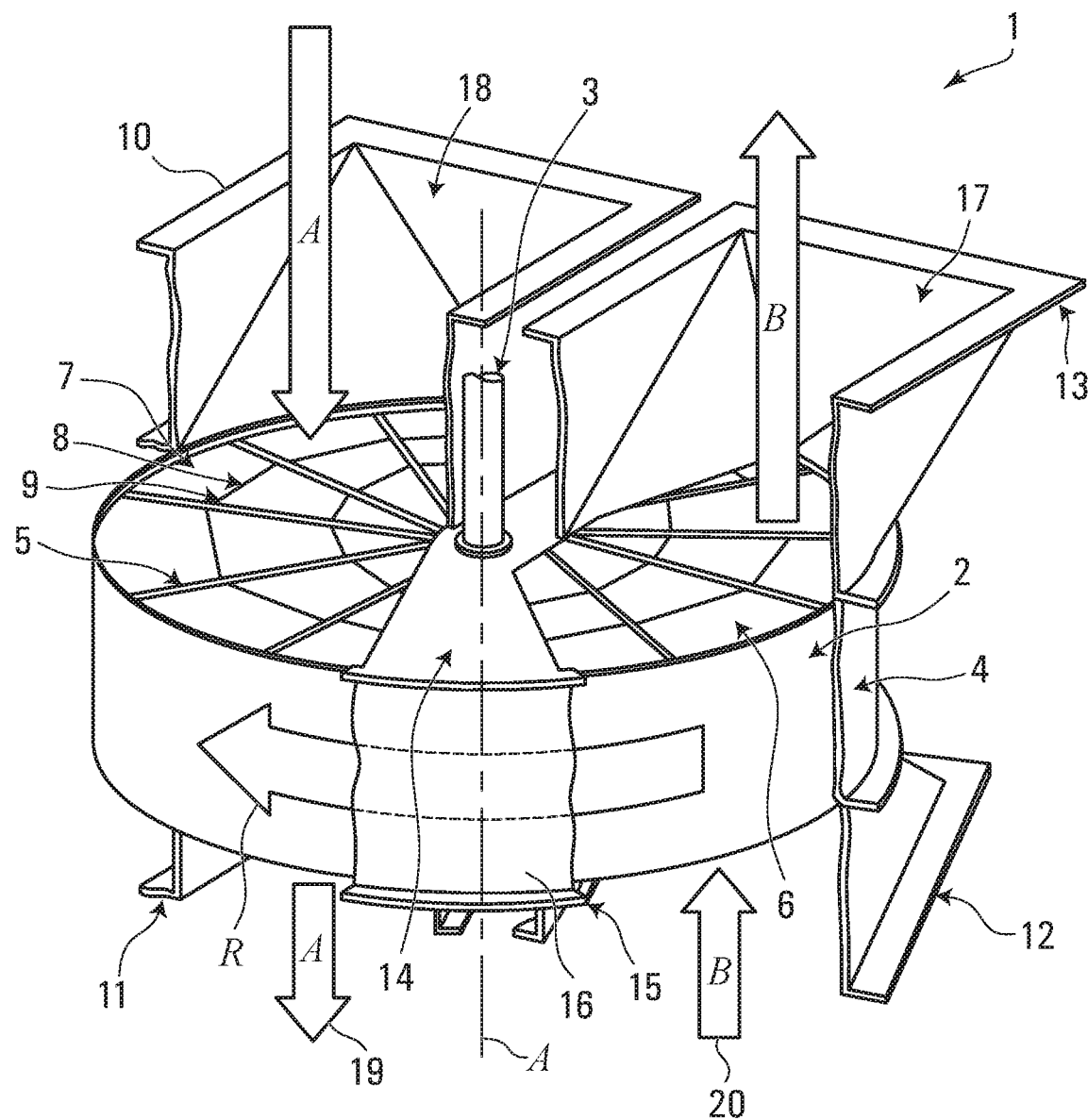
FIG. 1 is a schematic perspective view of a rotary regenerative preheater.

As shown in FIG. 1, a rotary regenerative air preheater is generally designated by the numeral 1. The preheater 1 includes a rotor assembly 2 rotatably mounted on a rotor post 3. The rotor assembly 2 is positioned in and rotates relative to a housing 4. For example, the rotor assembly 2 is rotatable about an axis A of the rotor post 3 in the direction indicated by the arrow R. The rotor assembly 2 includes partitions 5 (e.g., diaphragms) extending radially from the rotor post 3 to an outer periphery of the rotor assembly 2. Adjacent pairs of the partitions 5 define respective compartments 6 for receiving a heat transfer sheet assembly 7. Each of the heat transfer sheet assemblies 7 include a plurality of heat transfer sheets 8 and/or 9 (see, for example, FIG. 2) stacked against one another.

As shown in FIG. 1, the housing 4 includes a flue gas inlet duct 10 and a flue gas outlet duct 11 for the flow of heated flue gases through the preheater 1. The housing 4 further includes an air inlet duct 12 and an air outlet duct 13 for the flow of combustion air through the preheater 1. The preheater 1 includes an upper sector plate 14 extending across the housing 4 adjacent to an upper face of the rotor assembly 2. The preheater 1 includes a lower sector plate 15 extending across the housing 4 adjacent to lower face of the rotor assembly 2. The upper sector plate 14 extends between and is joined to the flue gas inlet duct 10 and the air outlet duct 13. The lower sector plate 15 extends between and is joined to the flue gas outlet duct 11 and the air inlet duct 12. The upper and lower sector plates, 14 and 15 respectively, are joined to one another by a circumferential plate 16. The upper sector plate 14 and the lower sector plate 15 divide the preheater 1 into an air sector 17 and a gas sector 18.

As illustrated in FIG. 1, the arrows marked 'A' indicate the direction of a flue gas stream 19 through the gas sector 18 of the rotor assembly 2. The arrows marked 'B' indicate the direction of a combustion air stream 20 through the air sector 17 of the rotor assembly 2. The flue gas stream 19 enters through the flue gas inlet duct 10 and transfers heat to the assemblies 7 mounted in the compartments 6. The heated assemblies 7 are rotated into the air sector 17 of the preheater 1. Heat stored in the assemblies 7 is then transferred to the combustion air stream 20 entering through the air inlet duct 12. Thus, the heat absorbed from the hot flue gas stream 19 entering into the preheater 1 is utilized for heating the assemblies 7, which in turn heats the combustion air stream 20.

Figure 2:
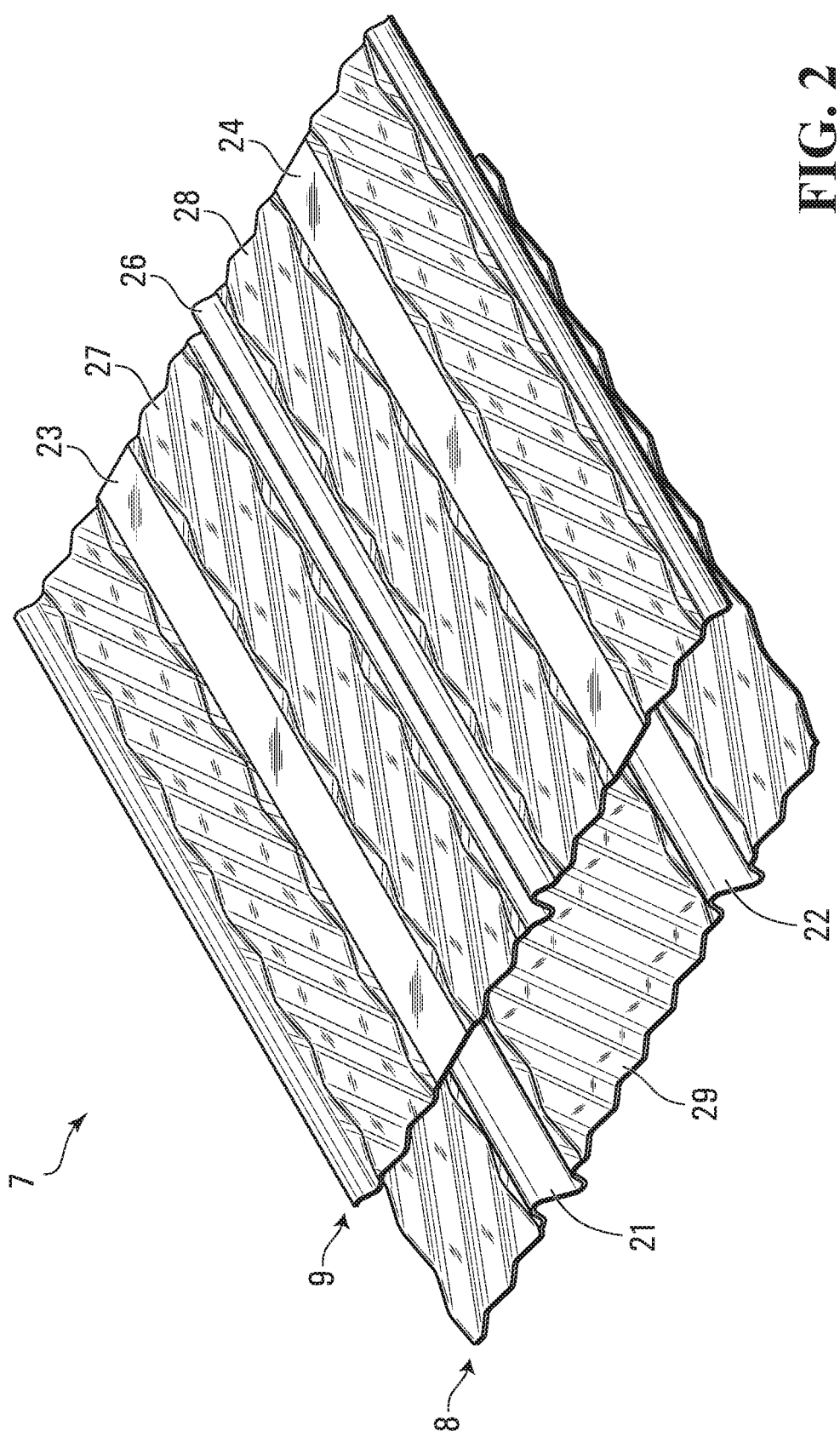
FIG. 2 is a perspective view of portions of two heat transfer sheets of a heat transfer sheet assembly in accordance with a first embodiment of the invention with the sheets offset longitudinally solely for illustrative purposes.
Figure 3:
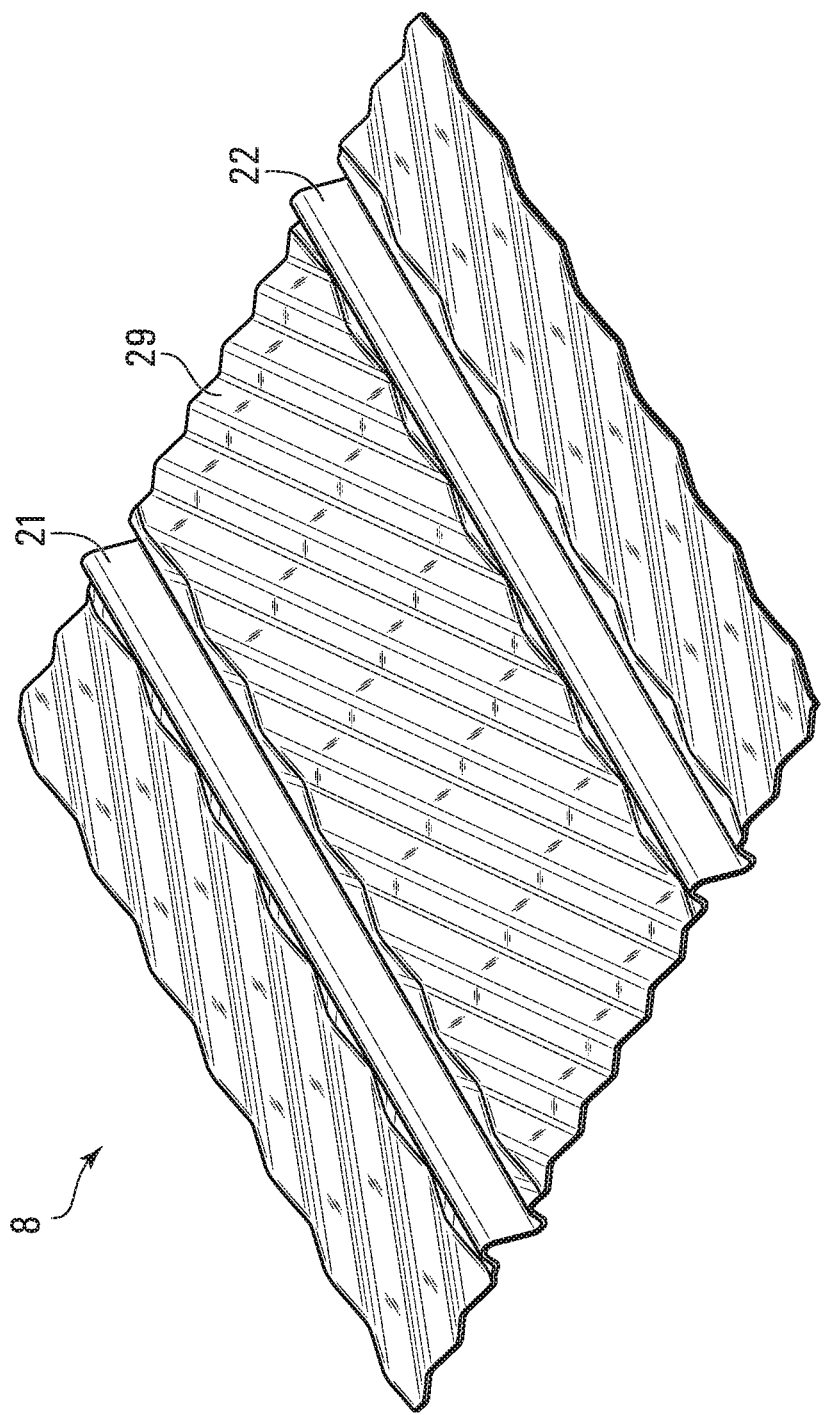
FIG. 3 is a perspective view of a portion of a first heat transfer sheet element of the assembly illustrated in FIG. 2.

In a first embodiment, as shown in FIG. 2, the heat transfer assembly 7 comprises a laminate of a multiplicity of heat transfer sheet elements 8 and 9 closely packed one after another under pressure and with sheets 8, 9 having distinct profiles. First sheet element 8, also illustrated in FIG. 3, is of a first profile or configuration comprising parallel wide gauged first 21 and second 22 sheet spacing features called notches which in this embodiment are in lateral cross-section of lobular form with oppositely extending lobes preferentially connected by a flat sheet material section operatively effective accurately to space apart adjacent elements. The lobular sheet spacing features 21, 22 extend parallel to the direction of intended gaseous flow from one end of the sheet to the other.

Figure 4:
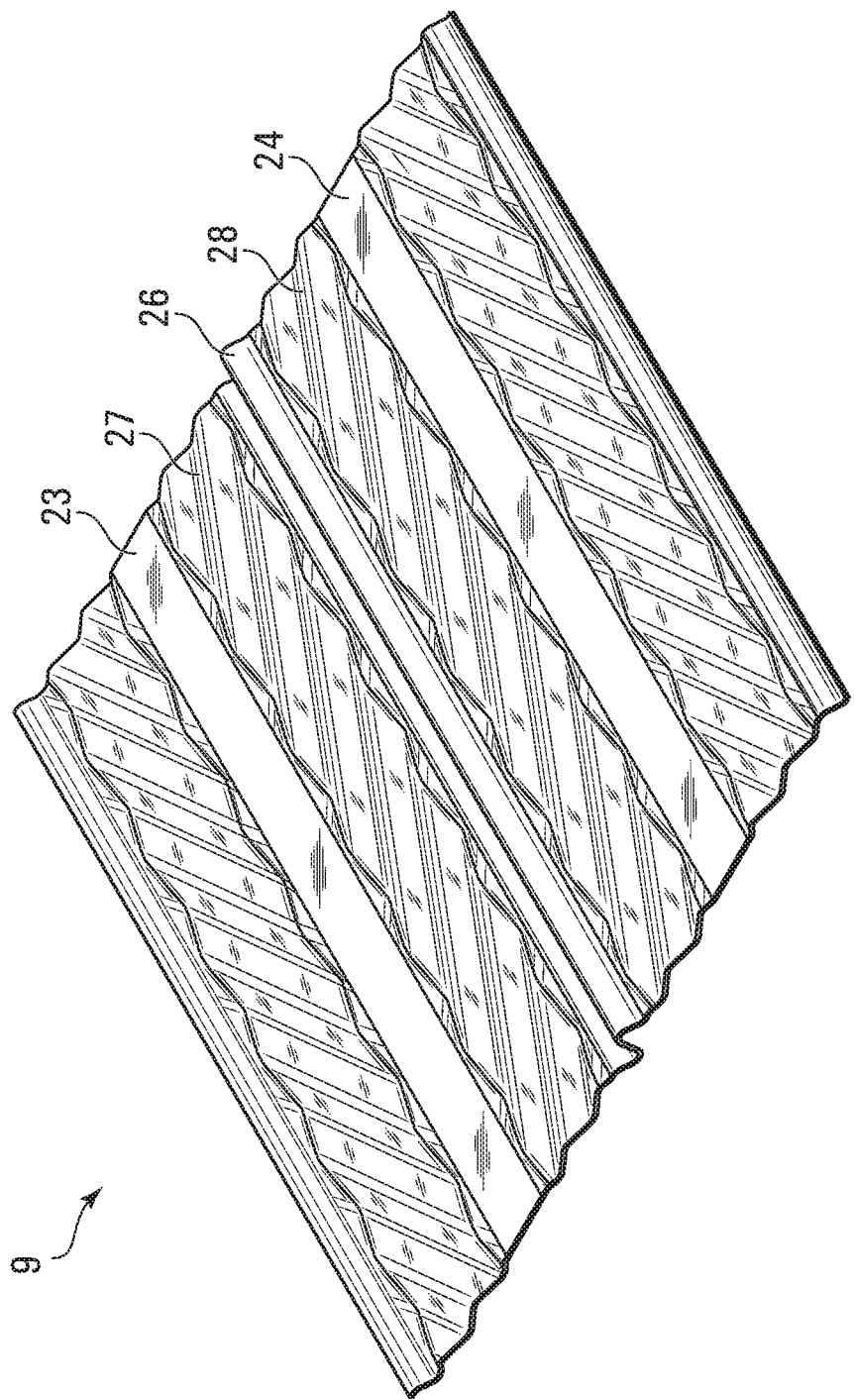
FIG. 4 is a perspective view of a portion of a second heat transfer sheet element of the assembly illustrated in FIG. 2.

Second sheet element 9, also illustrated in FIG. 4, is of a second profile or configuration comprising parallel wide gauged third 23 and fourth 24 sheeting spacing features which in this embodiment are flats generally in the nominal plane of element 9 which seat respectively against the features 21 and 22 of elements 8 (i.e. one sheet 8 under element 9 as shown in FIG. 2 and another element 8 over, not illustrated). The features of element 9 are also illustrated on FIG. 6 and the same features together with those of element 8 are illustrated on the cross-section of FIG. 5. From this cross-section it can be seen that the wide gauges of features 21, 22 and of features 23, 24 are equivalent so that features 21, 23 and 22, 24 respectively cooperate by seating one against the other to define an elongate close-sided gaseous flow channel 25 extending from one end of the assembly to the other.

It will be understood that whilst in the first embodiment element 8 is provided with lobes 21, 22 and sheet 9 with flats 23, 24, it remains conceivable that in another embodiment of the invention element 8 is provided with flats and element 9 with lobes. In yet another embodiment element 8 could be provided with a mixture of lobes and flats whilst element 9 has a corresponding and associated plurality of flats and lobes. In a further embodiment it could be that both elements 8 and 9 are provided with lobes or other crimped or stamped structures that facilitate the spacing apart of the sheets so as to define a plurality of close-sided gaseous flow channels 25 within the assembly 7.

Heat transfer sheet element 9 additionally in this and other embodiments of the invention comprises a fifth intermediate elongate sheet spacing feature 26 typically parallel and equidistant from its features 23 and 24. Element 9 further comprises a plurality of heat transfer undulations 27,28 of lesser amplitude than feature 26 extending laterally of the element 9 obliquely to the gaseous flow direction. Undulations 27 extend typically obliquely between the third 23 and fifth 26 sheet spacing features and similarly undulations 28 extend between the fifth 26 and fourth 24 sheet spacing features. Also, element 8 further comprises a plurality of heat transfer undulations 29 of lesser amplitude than the sheet spacing features 21, 22 extending laterally of element 8 therebetween and obliquely to the direction of gaseous flow and as illustrated in this first embodiment also obliquely of the undulations 27, 28 of the second sheet 9.

Figure 5:
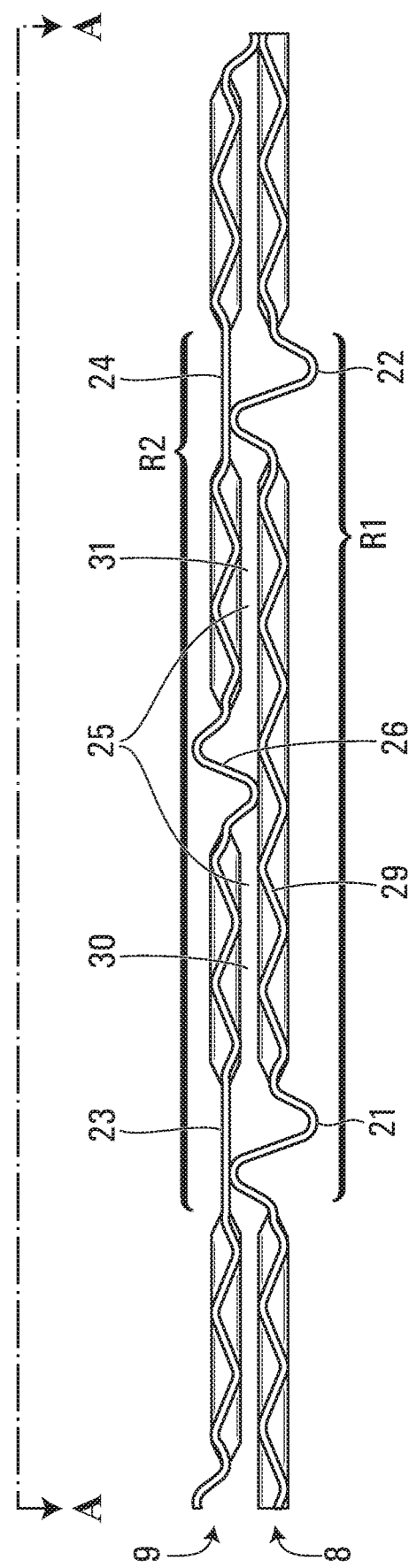
FIG. 5 is a partial cross-sectional view of the assembly illustrated in FIG. 2.
Figure 6:
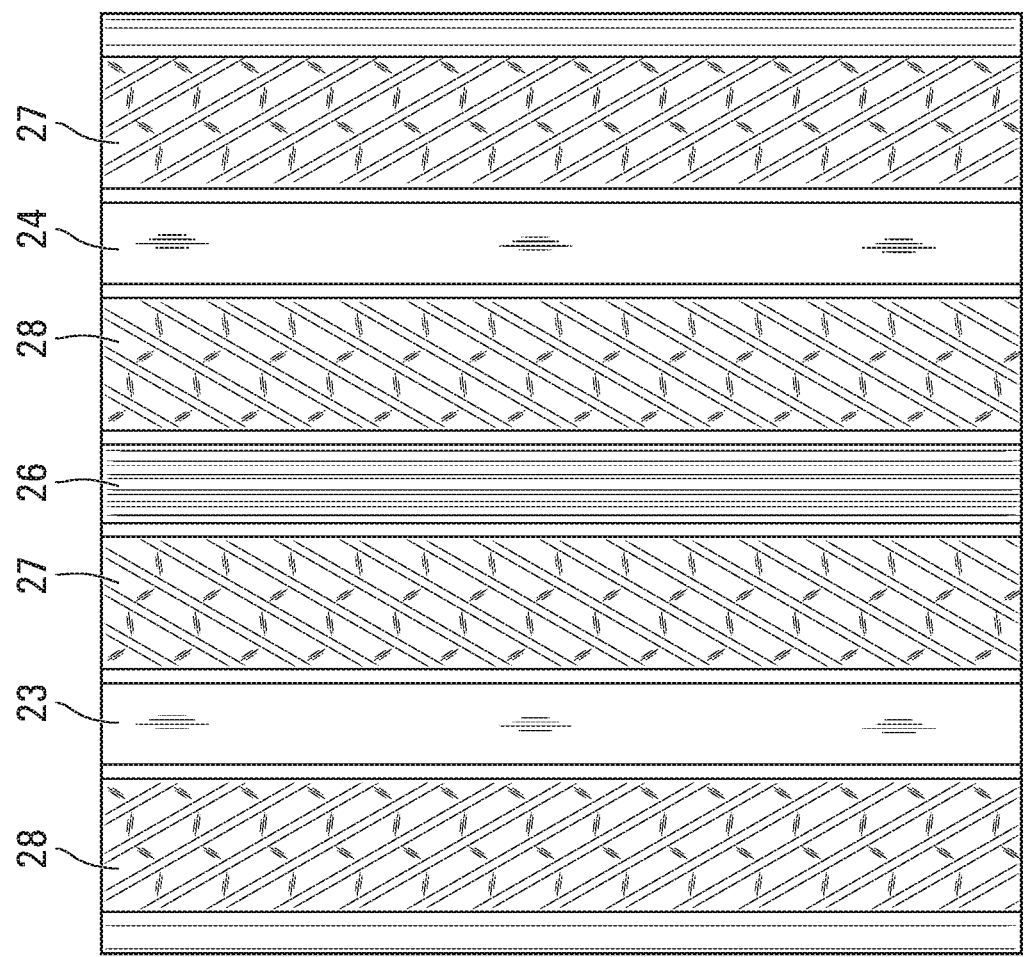
FIG. 6 is a planar view of the second heat transfer sheet element in the direction A-A shown in FIG. 5.

Advantageously, in this first embodiment the undulations 27, 28, and 29 are of similar cross-section and undulations 27, 28 are oblique to undulations 29. The intermediate sheet spacing feature 26 of element 9 is in contact with the undulations 29 of element 8 and provides additional structural rigidity to the gas channel 25. Typically sheet spacing feature 26 is of similar shape to the features 21, 22 albeit with lower amplitude and suitably extends the length or substantially the length of the element 8. In some embodiments, sheet spacing feature extends at least half of the length of element 8. Within the channel 25 can be found sub-channels 30, 31 with the intermediate sheet spacing feature 26 further defining a shared longitudinal side wall therebetween. As illustrated in FIG. 5, sub-channel 30 is defined between immediately adjacent pairs of sheet spacing features 21, 23 providing a closed side-wall and adjacent intermediate sheet spacing feature 26 contacting opposing peaks of undulations 29 providing a side-wall perforated by troughs of the undulations 29. Similarly, sub-channel 31 is defined between immediately adjacent pairs of sheet spacing features 22, 24 providing a closed side-wall and the adjacent intermediate sheet spacing feature 26 contacting opposing peaks of undulations 29 providing a side-wall perforated by troughs of the undulations 29.

The side-wall provided by the cooperation of feature 26 and undulations 29 is perforated to permit some transverse gaseous flow under the intermediate sheet spacing feature 26 whilst at the same time disturbing bulk skew along undulations 29. The intermediate sheet spacing feature 26 may provide an increased surface area for heat transfer as compared to other designs. This is believed in combination to be contributory to improved thermal performance of the heat transfer assembly.

Additionally, intermediate sheet spacing feature 26 in mechanical contact with undulations 29 inhibits drumming and/or vibration of the elements 8 and 9 between the respective spacing features 21, 22 and 23, 24. This is believed to help reduce the incidence of mechanical and fatigue damage.

In an alternative embodiment (not shown) the elongate intermediate sheet spacing feature 26 is replaced by an alternating notch configuration similar to the alternating notch disclosed in Applicant's U.S. patent application Ser. No. 14/877,451 filed on 7 Oct. 2015.

It will be readily understood that the provision of intermediate sheet spacing feature 26 provides increased structural rigidity to the gaseous flow channel 25 defined between cooperating features 21, 23 and 22, 24. Because this feature 26 provides a perforated side-wall to sub-channels 30, 31 it has been found surprisingly not to impact efficiency negatively in the manner anticipated above for an assembly having smaller gaseous flow channels. It is believed this is because turbulent flow of gas transverse of the gaseous flow channel is facilitated by gaseous flow through valleys of undulations 29 of element 8 traversing the feature 26.

As illustrated in FIG. 5, the gaseous flow channel 25 can also be considered to be defined between opposing repeats R1, R2 of the first profile of first sheet element 8 and of the second profile of second sheet element 9 respectively. The first repeat R1 of the first profile is defined between and including immediately adjacent first sheet spacing features 21 and second sheet spacing features 22 on sheet 8, i.e. including the corresponding undulations 29 extending therebetween. The second repeat R2 of said second profile is defined between and including immediately adjacent third sheet spacing feature 23 and the fourth sheet spacing features 24, i.e. encompassing also the corresponding fifth intermediate sheet spacing feature 26 and undulations 27, 28 disposed therebetween.

In this first embodiment the repeats R1 and R2 are each contiguous on the respective sheet elements 8 and 9. Here the second sheet spacing feature 22 of a one first repeat R1 is equivalent to first sheet spacing feature 21 of the next immediately adjacent repeat R1. Similarly the fourth sheet spacing feature 24 of a one second repeat R2 is equivalent to third sheet spacing feature 23 of the next immediately adjacent repeat R2. It will be appreciated that rather than being contiguous the repeats R1 and R2 could be spaced apart on their respective sheet elements 8, 9. Alternatively, the repeats R1 and R2 could be pattern repeats respectively immediately adjacent the next repeats R1 and R2. In such alternative configuration the second sheet spacing feature 22 of a one first repeat R1 is alongside and contacting first sheet spacing feature 21 of the next immediately adjacent repeat R1 and the fourth sheet spacing feature 24 of a one second repeat R2 is alongside and contacting third sheet spacing feature 23 of the next immediately adjacent repeat R2.

In an embodiment, heat transfer sheet elements are manufactured by cutting a sheet steel roll to a desired size and then passing cut sheet sections through crimping rollers that are profiled to impart the desired profiles to the crimped sheets. These crimped sheets are subsequently packed in a basket to create a heat transfer assembly having the desired flow, thermal and profiles configuration characteristics desired. Typically manufacturing tolerances for heat transfer elements is ±0.1778 mm (7 thousandth of an inch). Because the sheet element 8 and 9 are of different profiles these are crimped by respective matched pairs of rollers in an embodiment. In assembling one sheet to another manufacturing tolerances are cumulative and dimensional fit is subject to a tolerance of ±0.3556 mm (14 thousandth of an inch) in a two-sheet assembly. It has been found that such cumulative tolerances and quality differences between respective roller pairs being asymmetric in nature, i.e. one pair able to crimp closer to the desired nominal dimensions than the other, can result in problems in fit between the first sheet elements 8 and the second sheet elements 9.

For example, poor fit of the fifth intermediate features 26 could be problematic both from functional and durability perspectives. Loose fit of some or all of the fifth intermediate features 26 in any given heat transfer assembly 7 can lead to unwanted vibration during soot blowing that can be expected to lead to premature failure. Similarly, such loose fit might lead to fatigue failures during operation due to excessive vibration and/or adverse effects on the gaseous flow through the baskets of the heat transfer assembly 7.

In light of such potential issues that may arise due to asymmetric crimping the inventors have sought to design an embodiment of the invention manufactured in a process in which the repeat R1 of the profile of the first sheet element 8 and the repeat R2 of the profile of the second sheet element 9 of the previously described embodiment, or repeat equivalents thereto, are located on the same sheet cut from stock that has been crimped by a single pair of rollers (i.e. by a so called single roll process).

Figure 7:
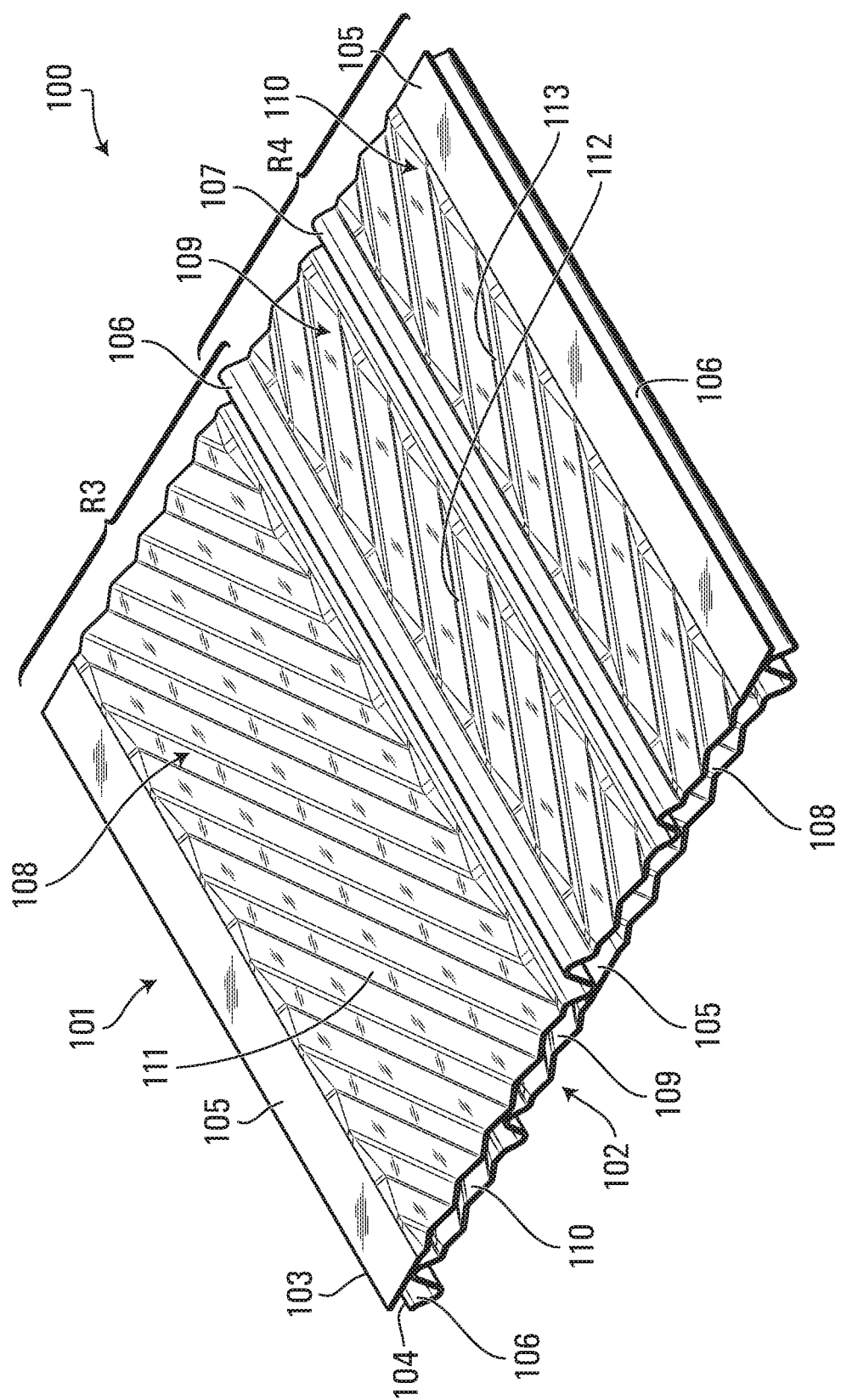
FIG. 7 is a perspective view of portions of two heat transfer sheets of a heat transfer sheet assembly in accordance with a second embodiment of the invention showing in detail a front face of one such sheet.
Figure 8:
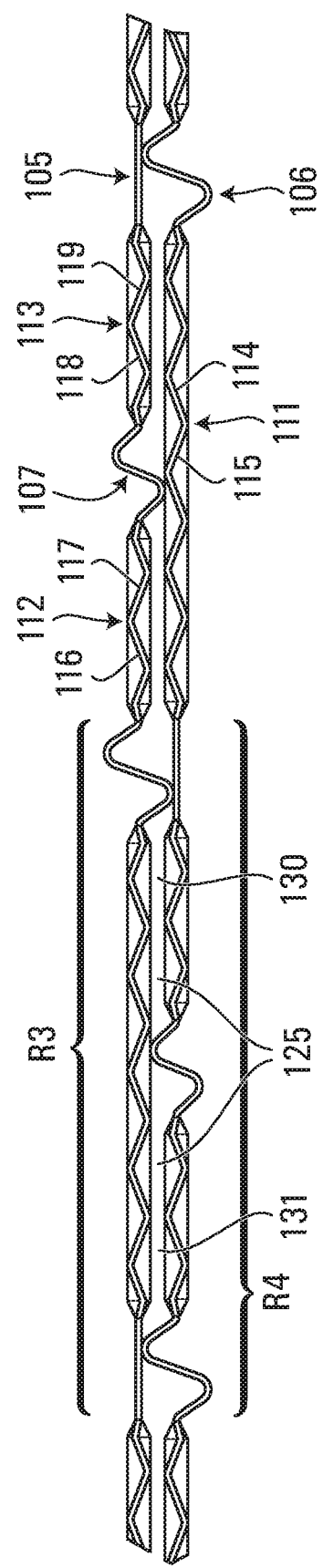
FIG. 8 is a partial cross-sectional view of the assembly illustrated in FIG. 7.

Another or second embodiment of the invention is manufactured using a single roll process and is illustrated in FIGS. 7 and 8. In this embodiment the inventors have been able to achieve manufacturing tolerances of ±0.0762 mm (3 thousandth of an inch) which is consistent on adjacent sheets as they are cut from the same crimped stock, leading to improved consistency and thereby potentially improved quality during fabrication of a heat transfer assembly 100 resulting therefrom.

The heat transfer assembly 100 comprises a laminate of a multiplicity of heat transfer sheet elements 101 and 102 closely packed one against another under pressure and aligned along their respective leading edges 103, 104. The sheet elements 101 and 102 are cut from the same crimped sheet stock and have the same third profile, repeating transversely across the elements 101, 102, which as clearly shown on the front face of element 101 illustrated comprises a flat first sheet spacing feature 105, a lobular second sheet spacing feature 106, a lobular third sheet spacing feature 107, wide gauge undulated planar heat transfer portion 108, and narrow gauge undulated planar heat transfer portions 109, 110.

In this second embodiment as illustrated in FIG. 7 the sheet spacing features 106, 107 are in lateral cross-section of lobular form with oppositely extending lobes preferentially connected by a flat sheet material section operatively effective accurately to space apart adjacent elements. The sheet spacing features 105 are flats generally in the nominal plane of the respective element 101, 102. The flat sheet spacing features 105 and the lobular sheet spacing features 106,107 extend longitudinally parallel to the direction of intended gaseous flow from one end of their respective sheet to the other.

This third profile of the second embodiment comprises a first repeat R3 defined between and including one first sheet spacing feature 105 and the immediately adjacent second sheet spacing feature 106 on sheet 101, i.e. including the corresponding wide gauge undulated portion 108 extending therebetween. The third profile also comprises a second repeat R4 defined between and including the aforementioned second sheet spacing feature 106 and the immediately adjacent next first sheet spacing feature 105 disposed transversely from the aforementioned one first sheet spacing feature 105, i.e. encompassing also the corresponding third intermediate sheet spacing feature 107 and the narrow gauge undulated portions 109, 110 disposed therebetween.

It will readily be understood that repeats R3, R4 in this second embodiment correspond in an operative sense respectively to repeats R1, R2 of the first embodiment as illustrated in FIGS. 2 to 6. By ensuring the leading edge 103 of element 101 is cut at the longitudinal edge of one sheet spacing feature 105 and the leading edge 104 of element 102 is cut at the edge of a corresponding one sheet spacing feature 106, the heat transfer assembly 100 is fabricated with repeats R3 on element 101 being paired with repeats R4 on element 102 and vice versa. Consequently, the intended spacing of element 101 and 102 is effected by the flat sheet spacing features 105 on one element 101, 102 seating against a corresponding lobular sheet spacing feature 106 on the other element 101, 102 and vice versa, i.e. by the flat sheet spacing feature 105 of one repeat R3 on element 101 seating against the lobular sheeting spacing feature 106 of a corresponding one repeat R4 on element 102 and so forth. Preferably, the planar orientation of elements 101,102 is the same so that the front face of one element opposes and in part contacts the back face of an immediately adjacent element and vice versa.

Matched pairs of repeats R3 and R4, with one being disposed on one of element 101, 102 and the other disposed on the other element 101, 102, provide a corresponding plurality of wide gauged closed-sided gaseous flow channels 125 each being bisected by a perforated mid-wall comprising the associated third sheet spacing feature 107 to provide a corresponding pair of sub-channels 130, 131. It will be understood that the channels 125, 130, 131 are functionally as described for the channels 25, 30, 31 of the first embodiment of FIG. 5.

The spacing between adjacent elements 101, 102 is maintained and overall structural rigidity may be improved by the elongate intermediate sheet spacing features 107 being in contact with peaks of the undulations 108 of immediately adjacent elements 101, 102. It will be appreciated that the amplitude of the intermediate sheet spacing features 107 is desirably equivalent to the amplitude of the undulations of the lobular sheet spacing features 106 less the maximum amplitude of undulations of which undulated portion 108 is comprised thereby ensuring point contact therealong.

The wide gauge undulated portions 108 each comprise a plurality of elongate parallel elongate lobular heat transfer undulations 111 extending obliquely to the direction of intended gaseous flow in a first right hand direction, and uninterrupted between the heat spacing features 105, 106. The narrow gauge undulated portions 109, 110 respectively comprise a plurality of bisected lobular heat transfer undulations 112, 113 extending parallel to one another and obliquely to the direction of intended gaseous flow in a second left hand direction, and between the heat spacing features 106, 105 but bisected by the intermediate heat spacing feature 107. Preferably the undulations 112, 113 are of equal or near equal length.

It will be seen that the axes respectively of corresponding right hand elongate undulations 111 and left hand bisected undulations 112, 113 intersect. Typically, these axes intersect at an angle of between 45 and 90 degrees. The axes of elongate undulations 111 intersect the longitudinal axes of the sheet spacing features 105, 106 at an angle of between 15 and 45 degrees. Similarly the axes of bisected undulations 112, 113 intersect the longitudinal axes of the sheet spacing features 105, 106, 107 at an angle of between 15 and 45 degrees.

As can be seen in FIG. 8, the elongate undulations 111 are each formed with intersecting flat side portions 114, 115 respectively meeting at the corresponding peak thereof. Similarly bisected undulations 112 are formed with intersecting flat side portions 116, 117 and bisected undulations 113 are formed with flat side portions 118, 119. Typically, the lateral cross-sectional profiles of undulations 111, 112 and 113 are identical having amplitudes in the order of half the spacing provided by the interaction of sheet spacing features 105, 106 minus the width of the gaseous flow channels 125.

It will be appreciated that whilst in the embodiment illustrated in FIG. 7 the right hand elongate undulations 111 and left hand bisected undulations 112, 113 are of similar cross-section, height and period, this need not necessarily be the case. Any one or more of these parameters could be different.

By maintaining the same planar orientation for elements 101, 102 it will be appreciated that within gaseous flow channels 125 right hand elongate undulations 108, 111 oppose left hand undulations 109, 110 (113, 114) and albeit spaced apart they directionally criss-cross one another. Whilst it might seem such an arrangement would create turbulent flow causing increased pressure drop across the resulting heat transfer assembly 100, it has in practice been found to introduce turbulence that improves heat transfer to undulated portions 108, 109, 110, 111 that is not negated by any reduction in gaseous mass flow resultant on any such increased pressure drop, i.e. it facilitates here an improvement in effective thermal performance. It is believed that heat transfer assemblies in accordance with this second embodiment would in practice reach a target up to 8 percent improvement in performance over different assemblies operating with the same thermal mass, gas input temperatures and pressure drop characteristics. In order to provide the aforementioned reduced manufacturing tolerances and maintain quality for profile repeats the inventors have, in place of the normal nominal 460 mm (18 inch) technology hitherto, used a larger roll typically at least demonstrably larger and have in one embodiment adopted a nominal 560 mm (22 inch) crimping.

In addition to the structural rigidity provided within a stack of heat transfer elements 101, 102 within the heat transfer assembly 100, the inventors have found that it is beneficial to ensure additional peripheral stability by providing additional support to the first and last elements 101, 102 in the stack. In particular supporting the peripheral undulated portions 108, 109, 110, i.e. those that do not oppose another undulated portion of another element 101, 102. This could be accomplished using support bars or other like formation attached to the baskets within which the elements 101,102 are stacked. A preferred construction is to sandwich the elements stack between two similar support plates or sheets with each having support features extending outwardly from the nominal planes of the respective plates which contact variously undulations 111, 112, 113 typically at contact points spaced apart by about 57 to 76 mm (2.25 to 3 inches), preferably every 69 mm (2.7 inches) appears effective in this regard.

Although the present invention has been disclosed and described with reference to certain embodiments thereof, it should be noted that other variations and modifications may be made, and it is intended that the following claims cover the variations and modifications within the true scope of the invention.

What is claimed is:

1. A heat transfer sheet assembly for a rotary regenerative heat exchanger, comprising:
   a first sheet element having a first profile comprising a plurality of parallel and elongate first and second sheet spacing features extending longitudinally in a gaseous flow direction, with a first repeat of said first profile being defined by and including the first and second sheet spacing features and a portion of the first sheet element extending between the first and second sheet spacing features; and
   a second sheet element of a length equivalent to the first sheet element, the second sheet element having a second profile comprising a complementary plurality of parallel and elongate third and fourth sheet spacing features with a second repeat of said second profile being defined by and including the third and fourth sheet spacing features and a portion of the second sheet element extending between the third and fourth sheet spacing features,
   the first sheet element being packed against the second sheet element with said first and third sheet spacing features seating against one another and the second and fourth sheet spacing features seating against one another, wherein the seated first and third sheet spacing features and the second and fourth sheet spacing features define a generally close sided elongate channel for gaseous flow therethrough,
   the first sheet element having lobular heat transfer undulations extending laterally and uninterrupted in between each of the first and second spacing features,
   the second sheet element further comprising an elongate fifth sheet spacing feature extending longitudinally along at least half a length of the second sheet element, intermediate each of the third and fourth sheet spacing features, the fifth sheet spacing feature comprising a lobe contacting at least some of the lobular heat transfer undulations between the first and second sheet spacing features of the first sheet element, the lobe of the fifth sheet spacing feature having an amplitude less than or equal to a spacing provided by the seated first and third sheet spacing features and the seated second and fourth sheet spacing features.

2. A heat transfer sheet assembly in accordance with claim 1, wherein each of the first sheet spacing features comprises a lobe extending away from a nominal plane of the first sheet element; and
   each of the third sheet spacing features comprises a flat in a nominal plane of the second sheet element.

3. A heat transfer sheet assembly in accordance with claim 1, wherein each of the second sheet spacing features comprises a lobe extending away from a nominal plane of the first sheet element; and
   each of the fourth sheet spacing features comprises a flat in a nominal plane of the second sheet element.

4. A heat transfer sheet assembly in accordance with claim 1, wherein each of the fifth sheet spacing features comprises a notch extending the length of the second sheet element and having the lobe extending away from a nominal plane of the second sheet element toward the said first sheet element and a second lobe extending in the opposite direction away from the first sheet element with the two lobes connected by a flat sheet section.

5. A heat transfer sheet assembly in accordance with claim 1, wherein each of the fifth sheet spacing features extends the length of the second sheet element and comprises a first elongate section having the lobe or a notch extending away from a central plane of the second sheet toward the first sheet element adjacent at least one second elongate section wherein opposing ends of the first and second elongate sections are connected to one another.

6. A heat transfer sheet assembly in accordance with claim 5, wherein each of the at least one second elongate sections comprises a lobe extending away from the central plane of the second sheet element oppositely to the first elongate section lobe.

7. A heat transfer sheet assembly in accordance with claim 1, wherein the second sheet element further comprises lobular heat transfer undulations extending laterally and uninterrupted respectively between the third and fifth sheet spacing features and the fifth and fourth sheet spacing features.

8. A heat transfer sheet assembly in accordance with claim 7, wherein the undulations of the first sheet element run oblique to the undulations of the second sheet element.

9. A heat transfer sheet comprising:
   a sheet element comprising a plurality of features extending longitudinally in a gaseous flow direction, the plurality of features comprising: lobular sheet spacing features, flat sheet spacing features, and undulated planar heat transfer portions,
   wherein the sheet element comprises a first repeat and a second repeat, the first repeat comprising:
      a first flat sheet spacing feature;
      a first undulated planar heat transfer portion immediately adjacent the first flat sheet spacing feature; and
      a first lobular sheet spacing feature immediately adjacent the first undulated planar heat transfer portion,
   the second repeat comprising:
      the first lobular sheet spacing feature;
      a second undulated planar heat transfer portion immediately adjacent the first lobular sheet spacing feature;
      a second lobular sheet spacing feature immediately adjacent the second undulated planar heat transfer portion;
      a third undulated planar heat transfer portion immediately adjacent the second lobular sheet spacing feature; and
      a second flat sheet spacing feature immediately adjacent the third undulated planar heat transfer,
   the first repeat and the second repeat alternating transversely along a width of the sheet element.

10. A heat transfer sheet assembly comprising:
    a first sheet element in accordance with the sheet elements of claim 9; and
    a second sheet element in accordance with the sheet element of claim 9,
    the first sheet element aligned with the second sheet element such that a first repeat positioned on the first sheet element is opposite a corresponding second repeat positioned on the second sheet element.

11. A heat transfer sheet assembly in accordance with claim 10, wherein each of the first sheet element and the second sheet element has a front face and a back face available for heat transfer, with the front face of the first sheet element opposing and in part contacting the back face of the second sheet element.

12. A heat transfer sheet assembly in accordance with claim 9, wherein:
    undulations of the first undulated planar heat transfer portion extend obliquely and uninterrupted between the first flat sheet spacing feature and the first lobular sheet spacing feature,
    undulations of the second undulated planar heat transfer portion extend obliquely and uninterrupted between the first lobular sheet spacing feature and the second lobular sheet spacing feature,
    undulations of the third undulated planar heat transfer portion extend obliquely and uninterrupted between the second lobular sheet spacing feature and the second flat sheet spacing feature.

13. A heat transfer sheet assembly in accordance with claim 12, wherein the undulations of the first undulated planar heat transfer portion extend in a first direction and undulations of the second undulated planar heat transfer portion and the third undulated planar heat transfer portion extend in a second direction different from the first direction.

14. A heat transfer sheet assembly in accordance with claim 1, comprising a multiplicity of first sheet elements and second sheet elements stacked in a basket and sandwiched between two support sheets with heat transfer undulations extending outwardly from the sheet elements immediately adjacent a respective support sheet contacting the respective support sheet at support points spaced apart laterally by about 57 to 76 mm (2.25 to 3 inches).

15. A heat transfer sheet assembly is accordance with claim 10, wherein:
    the first flat sheet spacing feature of the first repeat positioned on the first sheet element is seated against the first lobular sheet spacing feature of the second repeat positioned on the second sheet element,
    each second repeat positioned on the first sheet element is opposite a corresponding first repeat positioned on the second heat transfer element such that:
    (a) the first lobular sheet spacing feature of the second repeat positioned on the first heat transfer element is seated against the first flat sheet spacing feature of the first repeat positioned on the second heat transfer element, and
    (b) the second lobular sheet spacing feature of the second repeat positioned on the second heat transfer element is opposite the first undulated planar heat transfer portion of the first repeat positioned on the first heat transfer element and bisects a space between the first sheet element and the second sheet element to provide a channel on either side of the second lobular sheet spacing feature.

* * * * *